United States Patent [19]
Finfera

[11] Patent Number: 6,104,782
[45] Date of Patent: Aug. 15, 2000

[54] METHOD FOR MEASURING QUALITY DETERMINING PARAMETERS OF A FIRMLY CONNECTED COMMUNICATIONS TRANSMISSION LINK

[76] Inventor: Wolfram Finfera, Rueppstr. 57 D-81476, Munich, Germany

[21] Appl. No.: 08/979,030

[22] Filed: Nov. 26, 1997

[51] Int. Cl.[7] .............................. H04B 17/00; H04M 1/24
[52] U.S. Cl. .................. 379/5; 379/1; 379/6; 379/22; 379/29
[58] Field of Search .................... 455/67.1, 423, 455/67.4; 379/2, 5, 6, 21, 22, 23, 24, 25, 27, 29, 1, 26

[56] References Cited

U.S. PATENT DOCUMENTS

| | | | |
|---|---|---|---|
| 4,558,182 | 12/1985 | Perry et al. | 379/350 |
| 5,018,184 | 5/1991 | Abrams et al. | 379/29 |
| 5,425,076 | 6/1995 | Knippelmier | 379/27 |
| 5,490,204 | 6/1995 | Gulledge | 455/423 |
| 5,521,902 | 5/1996 | Furgeson | 370/248 |
| 6,026,145 | 2/2000 | Bauer et al. | 379/26 |

OTHER PUBLICATIONS

KMT Report, Jan. 1996: "Provable Quality Assurance With Analog and Digital Solid Connections" by Gunter Bretschneider.

*Primary Examiner*—Dwayne D. Best
*Assistant Examiner*—Temica M. Davis
*Attorney, Agent, or Firm*—Thomas F. Lenihan

[57] ABSTRACT

A method for measuring by means of a mobile auxiliary device, quality determining parameters of a communications transmission link which is firmly connected to at least one end thereof and includes a central measuring system. Precise determination of the quality determining parameters in one partial link (7) of the communications transmission link, the invention provides for the auxiliary device (12) to transmit a control signal to the measuring system (25). After receipt of the control signal in the measuring system (25), the communications transmission link is subdivided into two partial links (7, 8). Subsequently, it is verified in the measuring system (25) which of the partial links the auxiliary device (12) is connected to, after which the quality determining parameters of the verified partial link (7) of the communications transmission link are measured.

4 Claims, 4 Drawing Sheets

METHOD FOR MEASURING QUALITY DETERMINING PARAMETERS OF A FIRMLY CONNECTED COMMUNICATIONS TRANSMISSION LINK

FIELD OF THE INVENTION

Method for measuring quality determining parameters of a firmly connected communications transmission link The invention relates to a method for measuring—by means of a mobile auxiliary device—quality determining parameters of a communications transmission link which is firmly connected at at least one end thereof and includes a central measuring system, said auxiliary device being connected to the communications transmission link adjacent to a test connection terminating the firmly connected end of said communications transmission link.

BACKGROUND OF THE INVENTION

In a prior art method of this kind (Siemens KMT-Report, January 1996, pages 10 and 11) a mobile central unit as an auxiliary device is connected to a special line in the form of a communications transmission link which is firmly connected at at least one end thereof. In practice, said auxiliary device is connected adjacent to one end of the communications transmission link. In this prior art method, a central measuring system (measuring system MSy90) is connected to said special line. The auxiliary device is used for measuring quality determining parameters of the communications transmission link.

SUMMARY OF THE INVENTION

It is the object of the invention to provide a method which allows a specially precise determination of the quality determining parameters of segments of a communications transmission link.

This object is accomplished according to the invention by a method of the above mentioned type in that, by means of the auxiliary device, a control signal is transmitted to the test connection and the measuring system, the communications transmission link is subdivided into two partial links in the measuring system upon receipt of the control signal, the measuring system transmits a signal with an identification via the one partial link and a further signal with a different identification via the other partial link, the auxiliary device generates and transmits to the measuring system an acknowledgement signal containing said identification upon receipt of the one signal, the measuring system determines, by evaluating the identification contained in the acknowledgement signal, to which partial link the auxiliary device is connected, and the parameters of this partial link of the communications transmission link are measured.

The advantage of the method according to the invention is that after the communications transmission link has been subdivided into two partial links, it is possible to measure particularly precisely the partial link with the auxiliary device connected thereto, since signals input to the other partial link at the other end of the communications transmission link cannot adversely affect the measurement of the quality determining parameters.

In order to prevent one subscriber connected to the test connection from transmitting signals via the communications transmission link or its one partial link which might interfere with or falsify the measurement of the quality determining parameters, it is considered advantageous according to a further development of the method according to the invention to disconnect a subscriber connected to the test connection from the communications transmission link upon receipt of the control signal in the test connection.

For on-site mobile service it may be advantageous to measure the parameters with the auxiliary device since this will allow the measured values to be evaluated immediately on site.

On the other hand, however, it may also be considered advantageous under certain circumstances to measure the parameters with the measuring system if the measuring results are intended to be centrally stored or processed further.

DETAILED DESCRIPTION OF THE INVENTION

Figure 1:
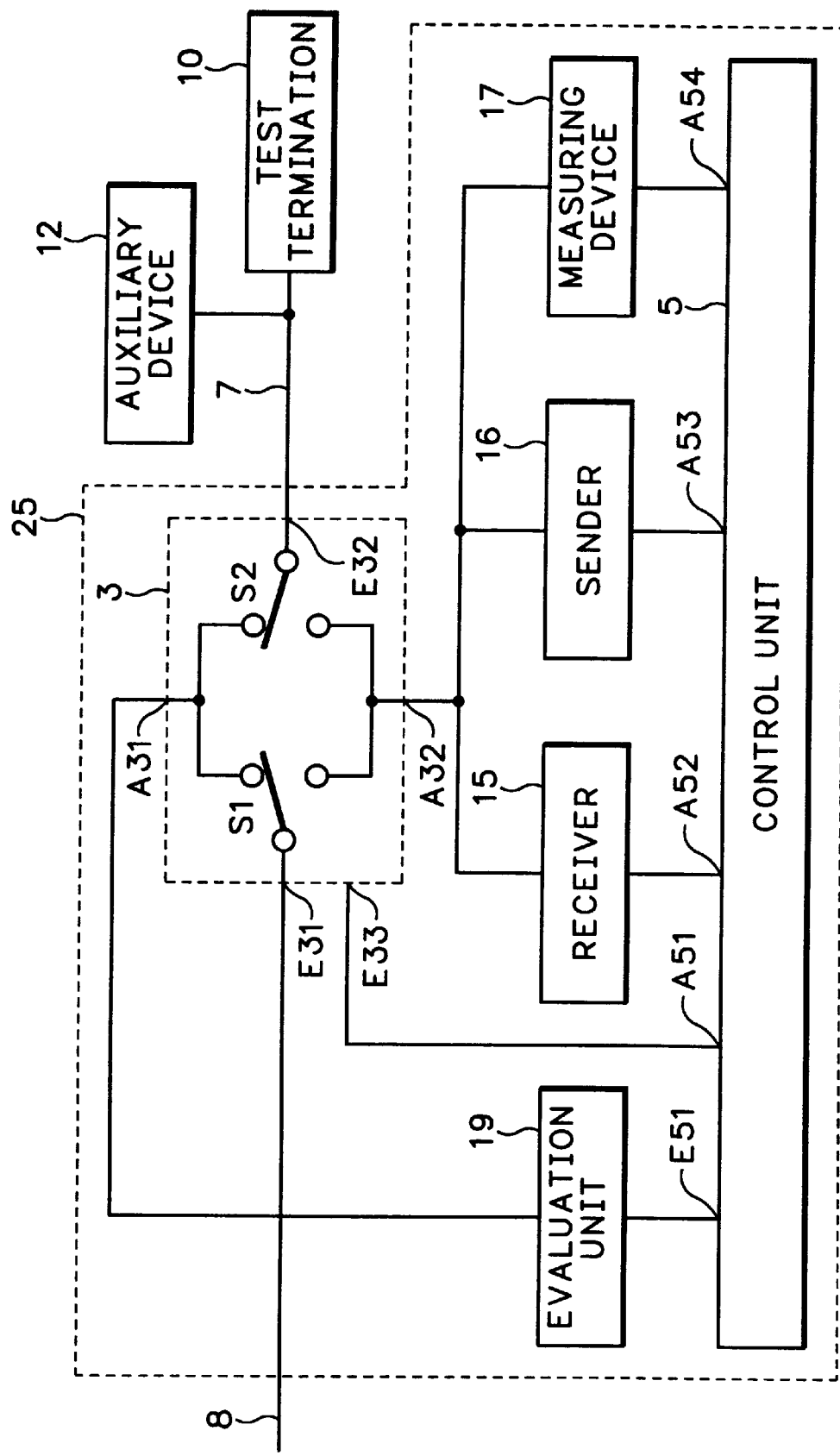
FIGS. 1 to 4 show, illustrated in different procedural stages, an embodiment of an arrangement for performing the method according to the invention.

FIG. 1 shows a switching device 3 with an input E31, a further input E32, an output A31, a further output A32 and a control input E33. The switching device 3 includes a switch S1 and a further switch S2 which are controlled (in a manner which is not shown) by a control unit 5 via the control input E33 of the switching device 3. In one switching position of the one switch S1, the one input E31 of the switching device 3 is connected to the one output A31 of the switching device 3. In the other switching position of the one switch S1, the one input E31 of the switching device 3 is connected to the further output A32 of the switching device 3. In the one switching position of the further switch S2, the further input E32 of the switching device 3 is connected to the one output A31 of the switching device 3. In the other switching position of the further switch S2, the further input E32 of the switching device 3 is connected to a further output A32 of the switching device 3. The switching device 3 subdivides a communications transmission link into two partial links 7 and 8. In the switching positions of the two switches S1 and S2 shown in FIG. 1, the two partial links 7 and 8 are interconnected to form the communications transmission link. One end of the one partial link 7 and thus one end of the communications transmission link is connected to a test termination 10. The other end of the one partial link 7 is connected to the further input E32 of the switching device 3. Adjacent to the test connection 10, an auxiliary device 12 is connected to the one partial link 7 and thus to the communications transmission link. Post-connected to the further output A32 of the switching device 3 are a receiver 15, a sender 16 and a measuring device 17. The one output A31 of the switching device 3 is connected to an evaluation unit 19, an output of which is connected to an input E51 of the control unit 5. One output A51 of the control unit 5 is connected to the control input E33 of the switching device 3. A further output A52 of the control unit 5 is connected to the receiver 15. Post-connected to an additional output A53 of the control unit 5 is the sender 16, and post-connected to a supplemental output A54 of the control unit 5 is the measuring device 17. The switching device 3, the control unit 5, the receiver 15, the sender 16, the measuring device 17 and the evaluating unit 19 form a central measuring system 25.

Figure 2:
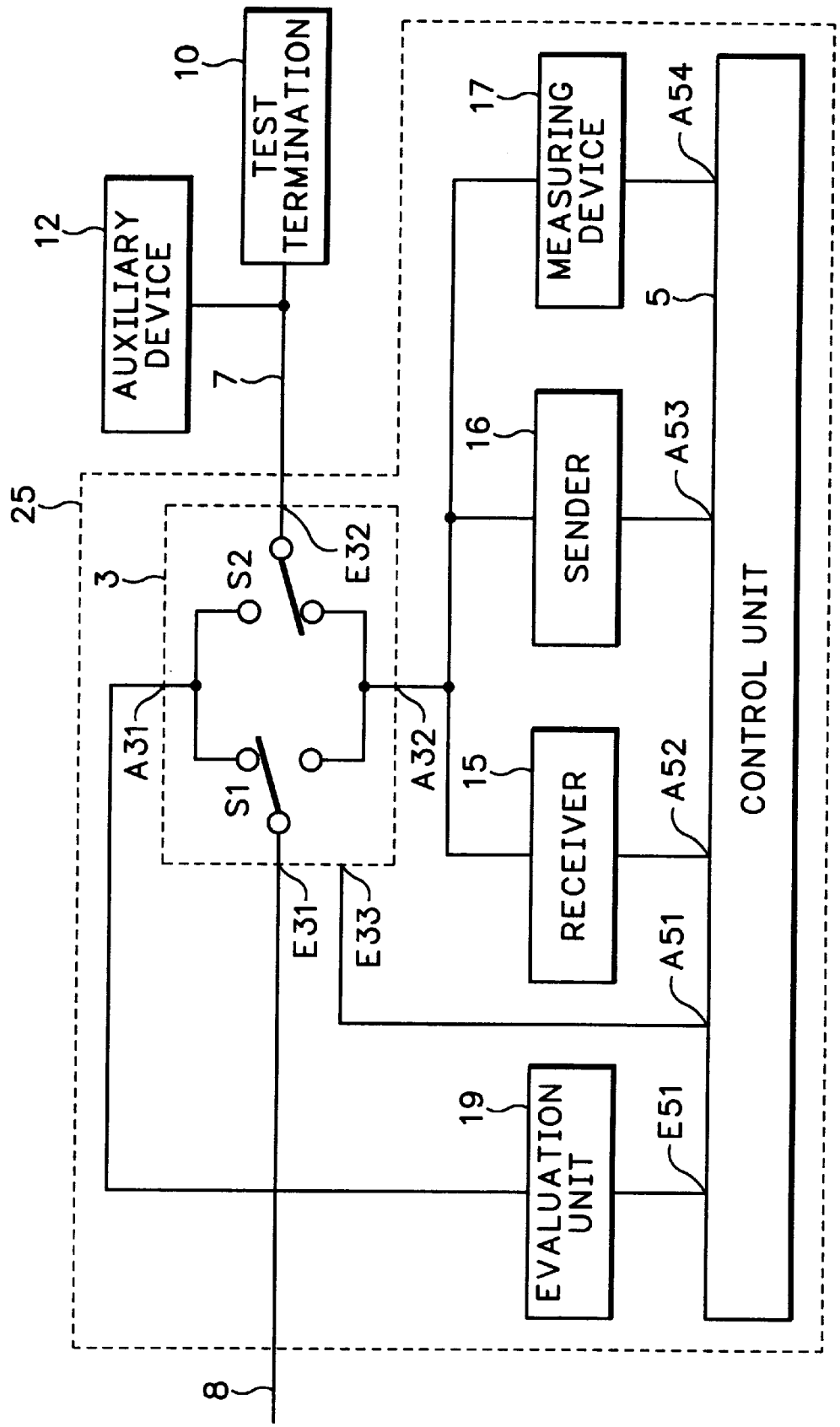

The method according to the invention is performed as follows using the arrangement of FIG. 1:

After the auxiliary device 12 has been connected to the communications transmission link, i.e. the partial link 7 thereof, the auxiliary device 12 sends a control signal to the test connection 10 and the measuring system 25. In the switching position of switches S1 and S2 shown in FIG. 1, the control signal is received in the evaluation unit 19 of the measuring system 25 and transmitted to the control unit 5. In the control unit 5, an auxiliary signal is then transmitted to the control input E33 of the switching device 3 which causes the switching position of the further switch S2 in the switching device 3 to change so that the further input E32 of the switching device 3 is now connected to the further output A32 of the switching device 3. The communications transmission link has now been subdivided into two partial links 7 and 8 (cf. FIG. 2). The control signal likewise reaches the test termination 10 in which a subscriber (not shown) connected to the test termination is disconnected from the communications transmission link and thus also from the one partial link 7. Subsequently, the sender 16 is controlled by the control unit 5 to cause a signal with an identification to be transmitted via the one partial link 7.

Figure 3:
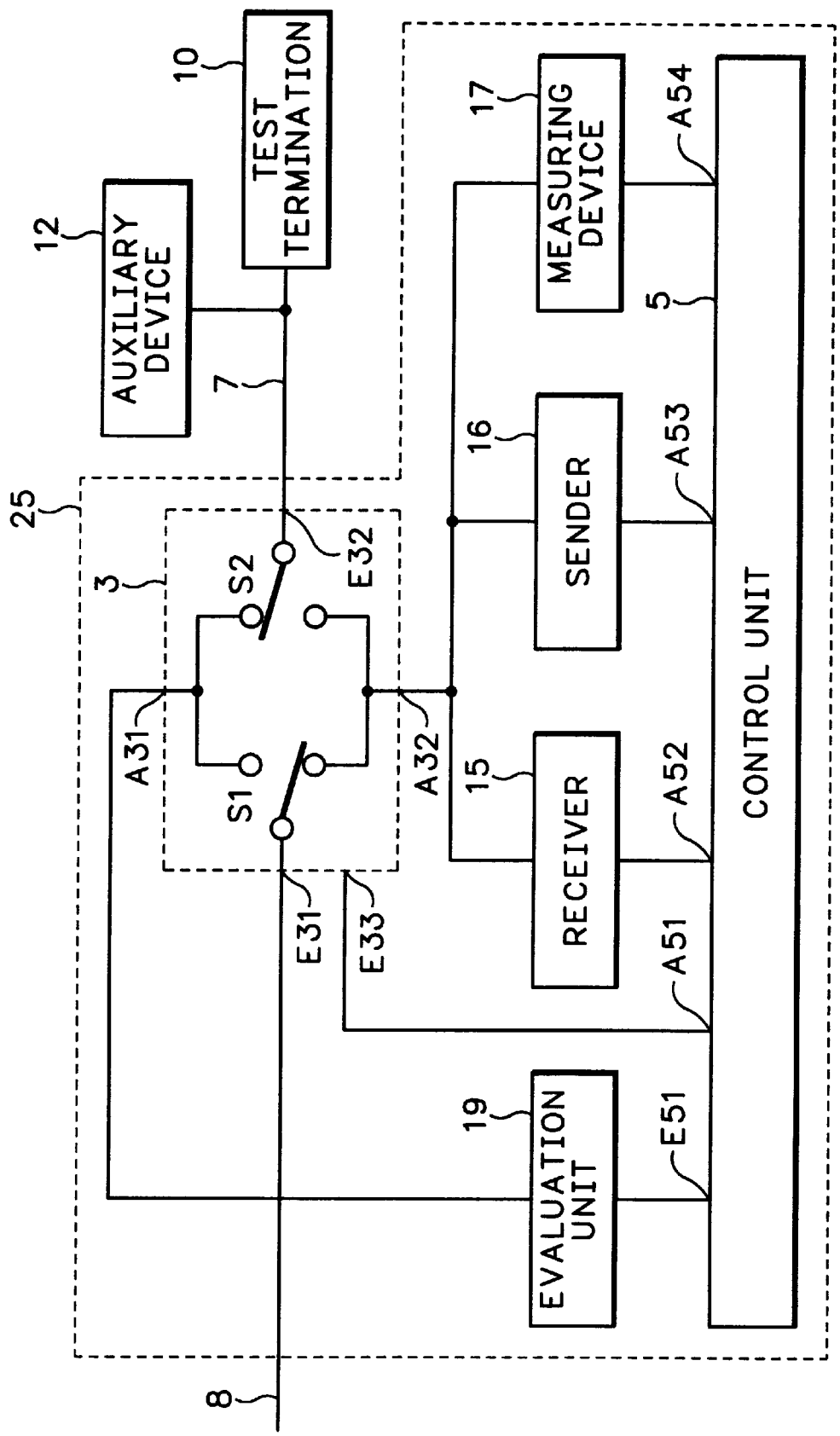

Afterwards, the switching device 3 is controlled by the control unit 5 again so as to cause the one switch S1 and the further switch S2 to change their switching positions (cf. FIG. 3). Now the one input E31 of the switching device 3 is connected to the further output A32 of the switching device 3 and the further input E32 of the switching device 3 is connected to the one output A31 of the switching device 3 whereupon the sender 16 transmits a further signal with a different identification via the other partial link 8.

Figure 4:
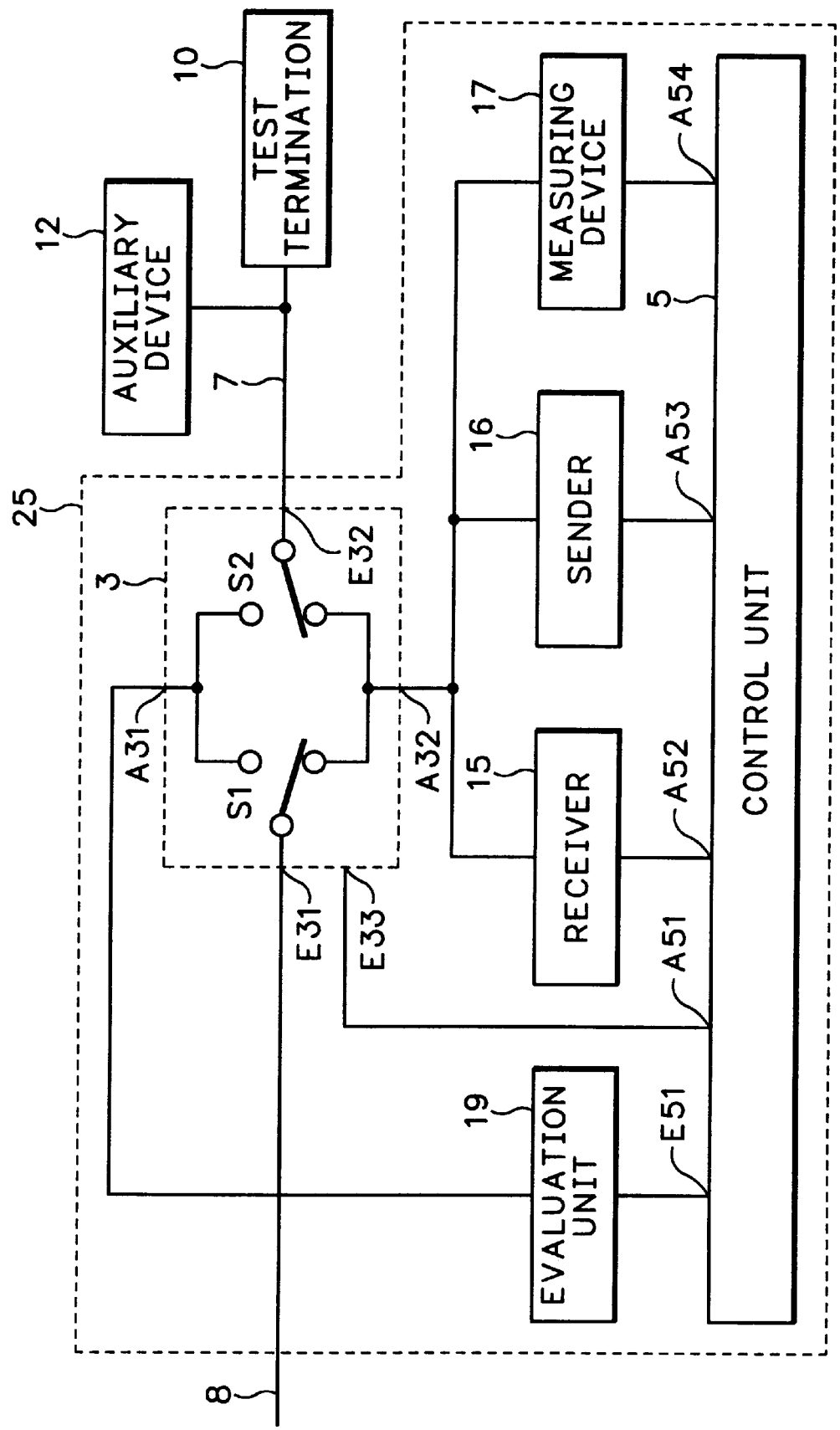

Now the further switch S2 is switched by the control unit 5 so that the further input E32 is now also connected to the further output A32 of the switching device. Subsequently, the receiving means 15 is activated by the control unit 5 so as to be in receive position (cf. FIG. 4).

In the auxiliary device 12, an acknowledgement signal containing the one identification is generated upon receipt of the one signal and transmitted to the measuring system 25. The acknowledgement signal is received by the receiver 15 and passed on to the control unit 5. In the control unit 5 it is determined by evaluating the identification in the acknowledgement signal which of the two partial links 7 or 8 the auxiliary device 12 is connected to. Subsequently, the switching device 3 is controlled by the control unit 5 such that the two switches S1 and S2 only connect the partial link to which the auxiliary device is connected—in this case the partial link 7—to the further output A32 of the switching device 3 and thus to the measuring device 17 (switching position as in FIG. 2). After the auxiliary device 12 has been connected to the measuring device 17, the quality determining parameters of this partial link 7 of the communications transmission link are measured. This measurement can be performed with the auxiliary device 12 or the measuring device 17 in the measuring system 25.

What is claimed is:

1. A method for measuring, by means of a mobile auxiliary device, quality determining parameters of a communications transmission link which is firmly connected to at least one end thereof and includes a central measuring system, comprising the steps of:

connecting the auxiliary device to the communications transmission link adjacent to a test connection terminating the firmly connected end of the communications transmission link;

sending a control signal to said test connection (10) and said measuring system (25) by means of said auxiliary device (12);

subdividing said communications transmission link into first and second partial links (7, 8) in said measuring system upon receipt of said control signal;

causing said measuring system to transmit a first signal with a first identification via said first partial link (7) and a further signal with a different identification via said second partial link (8);

causing said auxiliary device (12) to generate an acknowledgement signal containing said first identification, and to transmit same to said measuring system (25) upon receipt of said first signal;

determining in said measuring system (25) which of said first and second partials links is connected to said auxiliary device (12) by evaluating the identification contained in the acknowledgement signal; and measuring the parameters of the connected partial link (7, 8) of said communications transmission link.

2. The method of claim 1, further comprising the step of:

disconnecting a subscriber connected to said test connection (10) from said communications link upon receipt of said control signal by said test connection.

3. The method of claims 1 or 2 wherein said step of measuring the parameters is performed by said auxiliary device (12).

4. The method of claims 1 or 2 wherein said step of measuring the parameters is performed by said measuring system (25).

* * * * *